Dec. 15, 1964  F. B. SWANSON  3,160,904
ROOT CLEANER DEFLECTOR ASSEMBLY
Filed Oct. 3, 1963
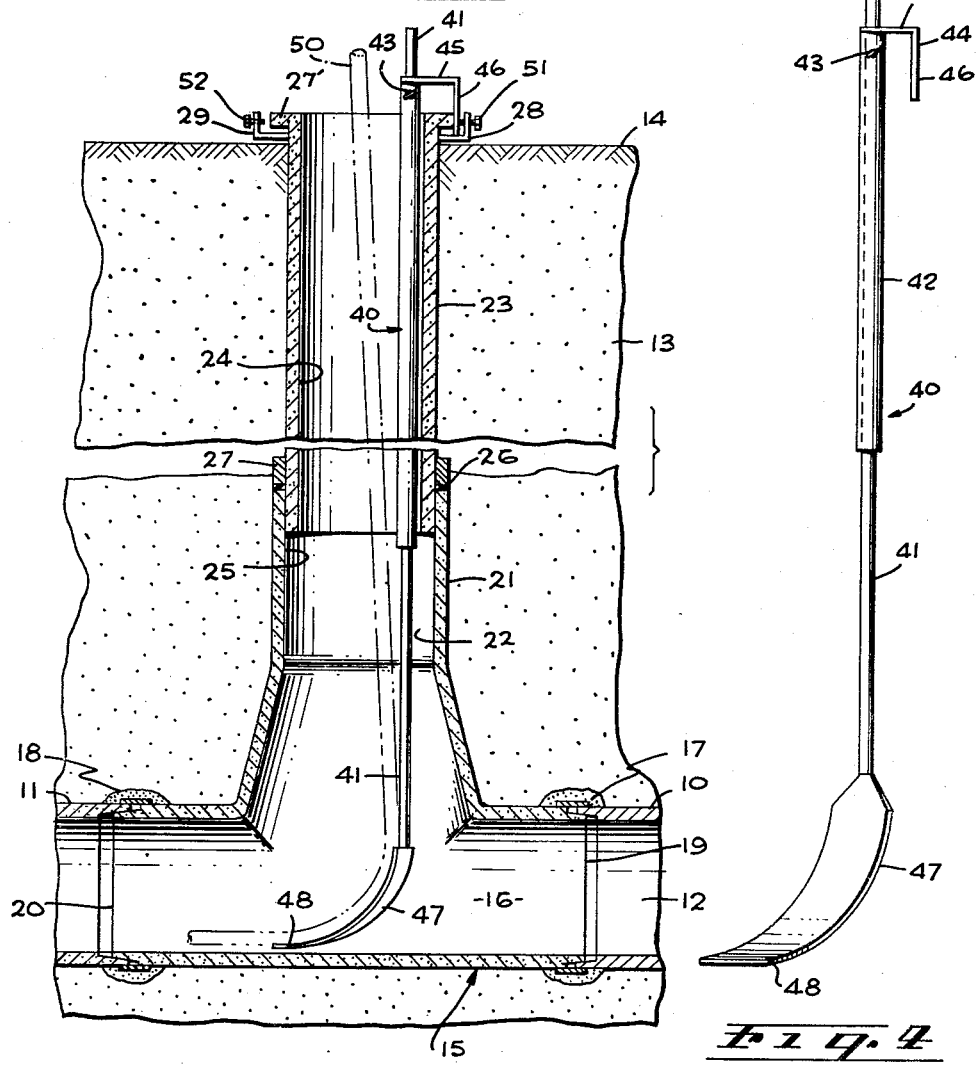
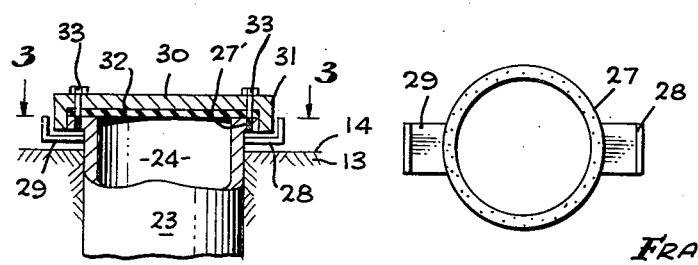
INVENTOR.
FRANK B. SWANSON
BY
Beehler & Shanahan
ATTORNEYS

United States Patent Office 3,160,904
Patented Dec. 15, 1964

3,160,904
ROOT CLEANER DEFLECTOR ASSEMBLY
Frank B. Swanson, 1016 E. Colorado Blvd.,
Glendale, Calif.
Filed Oct. 3, 1963, Ser. No. 313,686
3 Claims. (Cl. 15—104.3)

The invention relates to cleaning devices for pipes and has special reference to a means for guiding a cleaner, often defined as a "snake," as it is extended while being rotated into an underground pipe which is to be cleaned.

More particularly, the invention concerns fitting a pipeline with an access passage for reception of a deflector, the deflector being such that it can steer the snake or flexible cleaning shaft in a desired direction.

Drainpipes which extend through the ground for carrying away drain water are very often nothing more than clay pipes laid end to end with joints which are not sealed. In those portions of the country where there is no deep frost, such drainpipes often lie near the surface although they extend entirely underground. As plants and vegetation grows, roots creep into the pipe joints and there grow and expand, forming an obstruction to the flow of drain water and material carried by it through the pipes. Consequently, drainpipes of this kind need periodic cleaning. Cleaning is often done with a cutter fastened to the end of a flexible shaft, the flexible shaft being rotated as it is forced into the pipe so that the cutter scrapes and cuts roots from the interior of the pipe which thereafter may be flushed out by a flow of water.

One of the difficulties with scraping and cleaning drainpipes of this kind is that the length of pipe is often excessive, namely far longer than it is practical to reach with a cleaner of the type ordinarily used and any of the commercially available flexible shafts by means of which they are manipulated. This means that unless the pipeline is broken into somewhere near the extent of reach of the flexible shaft, the entire length of drainpipe cannot be cleaned. Breaking into a pipe has many objections. In the first instances, the ground must be dug up and this is an undesirable chore. Often, no fitting has been left in the pipe, or at least no fitting at the needed location and consequently the pipe itself must be broken for the cleaning job and thereafter a new pipe length inserted. Further still, these operations often need to take place where the pipe runs under a lawn or other area where tearing up the ground surface is objectionable as well as costly.

It is therefore among the objects of the invention to provide a new and improved device insertable into a drainpipe anywhere throughout its length for reception of a flexible root cutter so as to give access to the drainpipe at one or more locations in addition to the normal end of the pipe.

Another object of the invention is to provide a new and improved assembly which can be permanently inserted into a drainpipe in an unobtrusive manner at one or more locations throughout its length in such fashion that easy access is had to the drainpipe at intermediate locations for manipulation of a rotating root cutter.

Still another object of the invention is to provide a new and improved fitting assembly for a drainpipe which is of such character that a rotating root cutter at the end of a flexible shaft can be directed alternatively in either a downstream or upstream direction, thereby making it possible to reach an extent of drainpipe twice the length of the available flexible shaft.

Still another object of the invention is to provide a new and improved deflector assembly which can be permanently installed substantially flush with the ground surface and capped so as not to interfere with operation of the drain, but which can be temporarily uncapped for insertion into it of a conventional root cutter at the end of a flexible shaft, the assembly further being such as to include a deflector so that the cutter can be readily forced into the drainpipe in either an upstream or a downstream direction, and which is further so constructed that the deflector can be easily reversed to send the cutter in an opposite direction when needed.

With these and other objects in view, the invention consists in the construction, arrangement and combination of the various parts of the device, whereby the objects contemplated are attained, as hereinafter set forth, pointed out in the appended claims and illustrated in the accompanying drawings.

FIGURE 1 is a longitudinal sectional view of a drainpipe showing the deflector assembly in place and in operative condition.

FIGURE 2 is a fragmentary longitudinal sectional view of the upper end of the deflector assembly showing the assembly in capped condition when not in use.

FIGURE 3 is a cross-sectional view on the line 3—3 of FIGURE 2.

FIGURE 4 is a vertical perspective view of the deflector member taken from the assembly.

In an embodiment of the invention chosen for the purpose of illustration, there is shown a drainpipe line evidenced by pipes 10 and 11 lying in alignment and providing a passage 12 for drain water. The pipes are located in the earth 13 at a substantial distance below ground level 14. The pipes are preferably of conventional length, with some appropriate joint of conventional style between them.

Located in the pipeline between the pipes 10 and 11 is a special fitting indicated generally by the reference character 15. The fitting provides an intermediate passage 16 in alignment with the passage 12. Joints 17 and 18 are formed between respective ends 19 and 20 of the fitting 15 where they join the pipes 10 and 11. If desired, these joints 17 and 18 may be substantially conventional sealed joints as shown.

Extending upwardly from the ends 19 and 20 is a vertical section 21 having a vertical passage 22 therein which communicates with the intermediate passage 16 extending horizontally at the lower end as already made reference to. A collar 23 is provided with a similar vertical passage 24 in alignment with the passage 22 and in communication therewith. It is preferable to have the collar 23 telescopingly slidable within an inside surface 25 of the vertical section 22, and to provide some agency such as a gasket 26 and an adjusting ring 27 to generate sufficient friction in order that the collar stay in a desired position of extension with respect to the vertical section 21.

At the upper end of the collar is a flange 27' and this can be made approximately flush with the ground level 14. How near the ground level the flange is positioned will depend upon whether the ground level is covered with grass, how deep the grass may be, or whether bare of vegetation, as may sometimes be the case. A bracket 28 is fastened at one side to the upper end of the collar 23 and extends outwardly relative to the flange 27'. On the other side is a similar bracket 29. Normally, a cap 30 overlies the top of the collar, the cap being provided with an annular flange 31 which extends downwardly around the flange 27'. A washer 32 is located inside of the cap and fits over the flange 27' in sealing relationship when the cap is drawn into position by conventional bolts 33.

When a rotating root cutter on the end of a flexible shaft is to be employed to clean out the passage 12 in one direction or another, the cap 30 is removed. There is provided for insertion into the special fitting 23 a deflector member indicated generally by the reference character 40 and shown in perspective view in FIGURE 4. The deflector member consists of a lower shaft 41 which slides telescopingly within an upper tubular shaft 42 and which can be adjusted endwise with respect to the upper tubular shaft and held in position by an appropriate set screw 43. A bracket 44 has an arm 45 rigidly attached to the upper end of the tubular shaft 42 and an arm 46 at the outer end of the arm 45 extending in a downward direction. At the lower end of the lower shaft 41 is an arcuate or curved blade 47 which may be of any suitable breadth and having a lower extremity 48 which preferably rounds to a somewhat horizontal position so that it can be made substantially tangent to the bottom surface of the intermediate passage 16 in the special fitting 15. In operation, when the flexible shaft 50 carrying a root cutter (not shown) is to be worked toward the left of the passage 12, the deflector member 40 is inserted as shown. This means that the lower shaft 41 is loosened from the tubular shaft 42 by loosening the set screw 43 and the blade 47 moved downwardly until it bottoms in the passage 16. The bracket 44 is then lowered until the arm 46 touches the bracket 28 and a set screw 51 then tightened to hold the deflector member in position. The flexible shaft can then be pushed downwardly while rotating, through the vertical passages 24 and 22 until it strikes the blade 47 at which time it will be deflected by the concave surface of the blade in a direction from right to left.

After the cleaning operation has been accomplished in the section of the passage 12 toward the left, the flexible shaft is withdrawn and the deflector member then removed from its initial position by loosening the set screw 51 and then placed on the opposite side so as to be in engagement with the bracket 29 and a comparable set screw 52. The flexible shaft is then re-inserted and then this time, because the concave side of the blade 47 faces toward the right, the flexible shaft will be directed from left to right into the passage 12 and there rotated so that the appropriate cutter will do its work. In common parlance, one side of the passage 12 may be considered as the upstream from which the drain water flows and the opposite side the downstream side to which drain water flows.

After the cleaning operation has been completed and the flexible shaft withdrawn, the deflector member is also loosened and withdrawn and the cap 30 re-applied.

By placing a special fitting 15 of the type described at an intermediate position in the drain passage, one length of flexible shaft 50 can reach twice its length of drain passage. Should one fitting be insufficient to reach the entire length of the drain passage, then a second or even a third special section 15 may be inserted at one or more suitable locations so that a single flexible shaft of relatively conventional length will be all that may be needed to clean out the entire length of drain passage.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a sewer pipe line adapted to extend through the earth beneath ground level, a deflector assembly for directing the path of a flexible root remover comprising a pipe fitting having a horizontal passage adapted to interconnect in said pipe line, a vertical section having a vertical passage therein in communication with said horizontal passage, and including an open outside end, and a deflector member comprising a shaft, a curved blade having a concave side and attached at the lower end of said shaft, a bracket at the upper end of the shaft having a releasable attachment to said outside end, said bracket having one position on one side of said end wherein the concave side of said blade faces said horizontal passage in one direction, said bracket being removable and attachable to said end on the opposite side wherein the concave side of said blade faces said horizontal passage in the opposite direction, whereby to direct said flexible root remover in a selected direction from said vertical passage into said horizontal passage.

2. In a sewer pipe line adapted to extend through the earth beneath ground level, a deflector assembly for directing the path of a flexible root remover comprising a pipe fitting having a horizontal passage adapted to interconnect in said pipe line, a vertical section having a vertical passage therein in communication with said horizontal passage, and a collar having a vertically adjustable connection on said vertical section extending upwardly to ground level, said collar having a passage therein communicating with said vertical passage, and a deflector member comprising a shaft, said shaft having longitudinally extendable upper and lower parts, a curved blade having a concave side and attached at the lower end of said lower part, a bracket at the upper end of the upper part having a releasable attachment to the upper end of said collar, said bracket having one position on one side of said collar wherein the concave side of said blade faces said horizontal passage in one direction, said bracket being removable and attachable to the upper end of said collar on the opposite side wherein the concave side of said blade faces said horizontal passage in the opposite direction, whereby to direct said flexible root remover in a selected direction from said vertical passage into said horizontal passage.

3. In a sewer pipe line adapted to extend through the earth beneath ground level, a deflector assembly for directing the path of a flexible root remover comprising a pipe fitting having a horizontal passage adapted to interconnect in said pipe line, a vertical section having a vertical passage therein in communication with said horizontal passage, and including an open outside end, and a deflector member comprising a shaft, a curved blade having a concave side and attached at the lower end of said shaft, a bracket at the upper end of the shaft having a releasable attachment to said outside end, said bracket having one position on one side of said end wherein the concave side of said blade faces said horizontal passage in one direction, said bracket being removable and attachable to said end on the opposite side wherein the concave side of said blade faces said horizontal passage in the opposite direction, whereby to direct said flexible root remover in a selected direction from said vertical passage into said horizontal passage, and a sealing cap attachable to said outside end upon removal of said deflector member.

References Cited by the Examiner

UNITED STATES PATENTS

| 973,537 | 10/10 | Miller | 166—117.5 |
| 2,163,947 | 6/39 | Hochberger | 15—104.3 |
| 2,758,917 | 8/56 | Popp | 15—104.3 X |
| 3,043,121 | 7/62 | Truman | 15—104.3 X |

FOREIGN PATENTS 93,470 11/38 Sweden.

CHARLES A. WILLMUTH, *Primary Examiner.*